US008606925B2

(12) United States Patent
Bailey et al.

(10) Patent No.: US 8,606,925 B2
(45) Date of Patent: *Dec. 10, 2013

(54) AUTOMATIC GENERATION OF REUSABLE NETWORK CONFIGURATION OBJECTS

(75) Inventors: Kimberly T. Bailey, Raleigh, NC (US);
Jeffrey B. Cates, Raleigh, NC (US);
Diane I. Shannon, Raleigh, NC (US);
Mark T. Wright, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,792

(22) Filed: Apr. 4, 2011

(65) Prior Publication Data

US 2012/0254438 A1    Oct. 4, 2012

(51) Int. Cl.
*G06F 15/173* (2006.01)
(52) U.S. Cl.
USPC .......................................... 709/226; 718/104
(58) Field of Classification Search
USPC ................. 718/104; 707/999.01; 709/229; 717/120, 169; 714/4.11; 706/15, 47; 711/170
See application file for complete search history.

(56) References Cited

U.S. PATENT DOCUMENTS

| | | | | |
|---|---|---|---|---|
| 5,838,965 A * | 11/1998 | Kavanagh et al. | ..................... | 1/1 |
| 6,026,403 A * | 2/2000 | Siefert | ..................... | 707/999.01 |
| 6,990,527 B2 * | 1/2006 | Spicer et al. | ................... | 709/229 |
| 7,328,260 B1 * | 2/2008 | Muthiyan et al. | ............. | 709/224 |
| 7,340,578 B1 * | 3/2008 | Khanzode | ..................... | 711/170 |
| 7,464,145 B2 | 12/2008 | Strassner | | |
| 7,493,377 B2 * | 2/2009 | Finni | .............................. | 709/220 |
| 7,516,457 B2 * | 4/2009 | Eilam et al. | ................... | 718/104 |
| 7,574,413 B2 * | 8/2009 | Larson et al. | ................... | 706/47 |
| 7,603,327 B2 * | 10/2009 | Esfahany | ........................ | 706/15 |
| 7,685,167 B2 * | 3/2010 | Mueller | ..................... | 707/999.2 |
| 7,711,000 B2 | 5/2010 | Hu et al. | | |
| 8,020,034 B1 * | 9/2011 | Shrivastava et al. | ......... | 714/4.11 |
| 2004/0107277 A1 * | 6/2004 | Levesque et al. | ............. | 709/223 |
| 2005/0138625 A1 * | 6/2005 | Carroll et al. | ................ | 718/104 |
| 2007/0192447 A1 | 8/2007 | Huynh et al. | | |
| 2008/0043719 A1 | 2/2008 | Pok et al. | | |
| 2009/0019138 A1 | 1/2009 | Strassner | | |
| 2009/0328024 A1 * | 12/2009 | Li et al. | ........................ | 717/169 |
| 2012/0254441 A1 | 10/2012 | Bailey et al. | | |

OTHER PUBLICATIONS

Non-final office action dated Oct. 24, 2012 regarding U.S. Appl. No. 13/423,186, 13 pages.
Notice of Allowance, dated Aug. 8, 2013, regarding USPTO U.S. Appl. No. 13/423,186, 9 pages.

* cited by examiner

*Primary Examiner* — Dustin Nguyen
(74) *Attorney, Agent, or Firm* — Yee & Associates, P.C.; David A. Mims, Jr.

(57) ABSTRACT

A system automatically captures network resources of each individual system of a networked system. The method defines a reusable object name for each class of network resources captured from the individual systems. Each class of network resources has at least one common feature. The system automatically maps each network resource having a particular class of each individual system to the reusable object name defined for that particular class. Embodiments enable individual system-specific resources, such as IP addresses, to be mapped to reusable objects. In some embodiments, reusable objects names may be combined to form higher-level configuration objects, such as network configuration rules.

14 Claims, 5 Drawing Sheets

| System 1 | System 2 | ... | System n |
|---|---|---|---|
| port 21 ftp | port 21 ftp | ... | port 21 ftp |
| port 23 telnet | port 23 telnet | ... | port 23 telnet |
| port 25 mail | port 25 mail | ... | port 25 mail |
| ... | ... | ... | ... |
| ifint c.d.1 | ifint c.d.2 | ... | ifint c.d.n |
| ifvipa x.y.1 distributor | ifvipa x.y.2 target, backup | ... | ifvipa x.y.n target, backup |
| ifeth a.b.1 | ifeth a.b.2 | ... | ifeth a.b.n |
| ... | ... | ... | ... |
| rule 1 permit port 23 a.b.1 | rule 1 permit port 23 a.b.2 | ... | rule 1 permit port 23 a.b.n |
| rule 2 permit port 25 a.b.1 | rule 2 permit port 25 a.b.2 | ... | rule 2 permit port 25 a.b.n |
| ... | ... | ... | ... |

FIG. 3

| Name | System 1 | System 2 | ... | System n |
|---|---|---|---|---|
| FTP | port 21 | port 21 | ... | port 21 |
| TELNET | port 23 | port 23 | ... | port 23 |
| MAIL | port 25 | port 25 | ... | port 25 |
| ... | ... | ... | ... | ... |
| IFINT | c.d.1 | c.d.2 | ... | c.d.n |
| IFVIPA | x.y.1 distributor | x.y.2 target, backup | ... | x.y.n target, backup |
| IFETH | a.b.1 | a.b.2 | ... | a.b.n |
| ... | ... | ... | ... | ... |
| RULE 1 | permit TELNET IFETH | permit TELNET IFETH | ... | permit TELNET IFETH |
| RULE 2 | permit MAIL IFETH | permit MAIL IFETH | ... | permit MAIL IFETH |
| ... | ... | ... | ... | ... |

FIG. 4

AUTOMATIC GENERATION OF REUSABLE NETWORK CONFIGURATION OBJECTS

BACKGROUND

The present invention relates generally to the field of data communication, and more particularly to systems and computer program products for automatically generating reusable network configuration objects in clustered systems.

Clustered systems are defined to work as a unit, and they typically appear as such to network clients communicating with target applications running on the individual machines of the cluster. The machines of the cluster are attached to the same communications and storage networks and they run the same applications. The machines of the cluster work together for backup and recovery and load balancing. The clustered systems typically share the same configurations and network policies.

It is desirable to be able to create reusable network configuration objects. Certain configuration resources, such as TCP or UDP ports and security encryption and authentication levels for network security policy are the same for each individual system in the cluster. Accordingly, such resources are non-system-specific and it is not difficult to create reusable configuration objects for such resources. However, certain resources, such as IP addresses are unique to each individual system. Moreover, individual systems typically have several different IP addresses. Accordingly, it is difficult and time consuming to create reusable configuration objects for system specific resources.

BRIEF SUMMARY

Embodiments of the present invention provide systems and computer program products for creating reusable configuration objects for use in configuring networked, and more particularly clustered, systems. In one embodiment, the system automatically captures network resources of each individual system of the networked system. The system defines a reusable object name for each class of network resources captured from the individual systems. Each class of network resources has at least one common feature. The system automatically maps each network resource having a particular class of each individual system to the reusable object name defined for that particular class. Embodiments enable individual system-specific resources, such as IP addresses, to be mapped to reusable objects. In some embodiments, reusable objects names may be combined to form higher-level configuration objects, such as network configuration rules.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 is a pictorial representation of network configuration resources captured according to an embodiment of the present invention;

FIG. 4 is pictorial representation of a table that maps resources to reusable object names according to an embodiment of the present invention;

DETAILED DESCRIPTION

Figure 1:
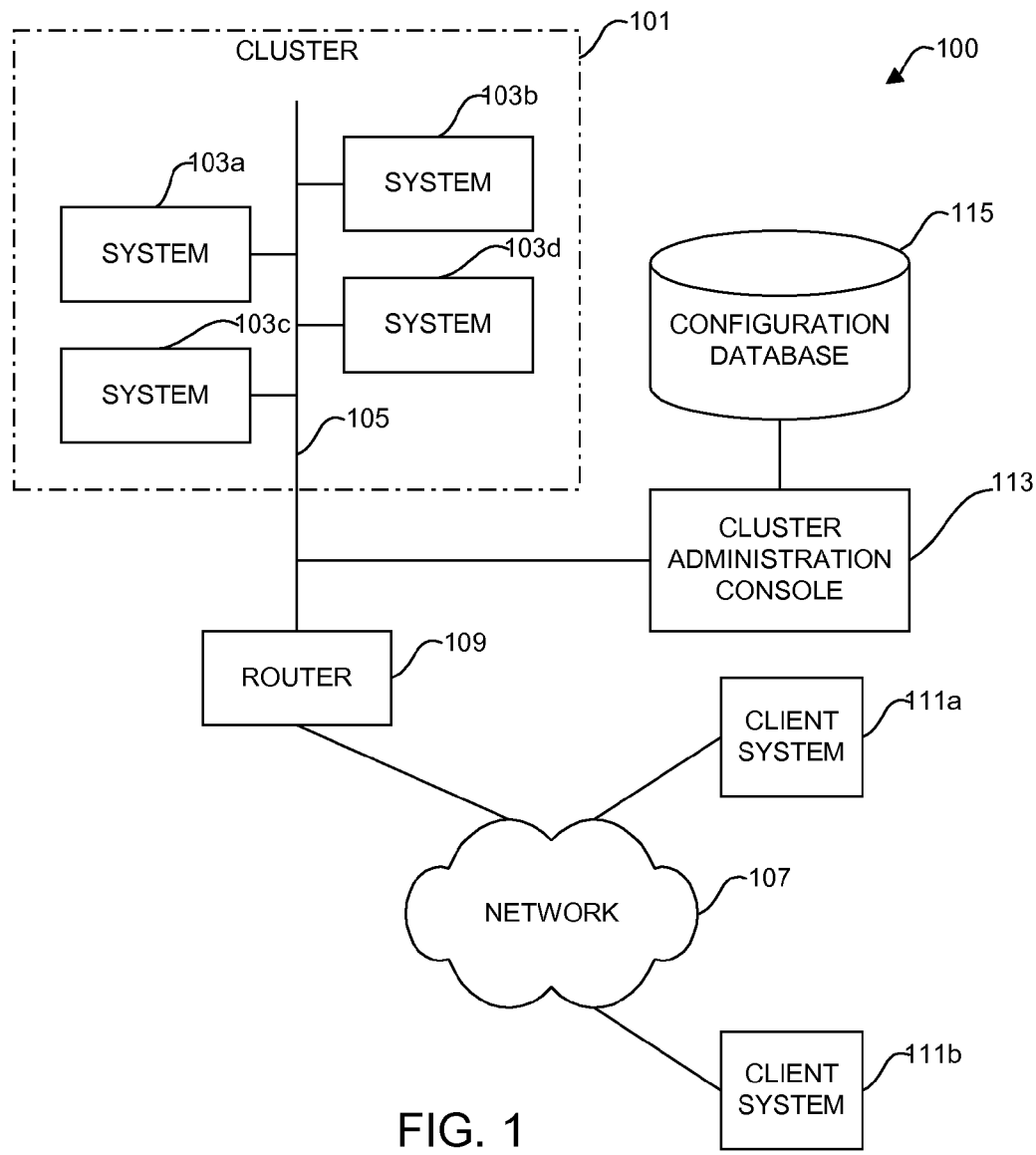
FIG. 1 is a block diagram of an embodiment of a system according to the present invention.

Referring now to the drawings, and first to FIG. 1, a system is designated generally by the numeral 100. System 100 includes a cluster 101. Cluster 101 comprises individual member computer systems 103 connected to a network 105, which may be a local area network (LAN). While four systems 103 are illustrated, a cluster may comprise from two to many individual computer systems.

LAN 105 is coupled to a network 107 by a router 109. Network 109 may comprise the Internet. Cluster 101 communicates with client systems 111 over network 107 and LAN 105. Although cluster 101 comprises individual member systems 103, cluster 101 appears to client systems 111 as a single entity.

System 100 includes a cluster administration console 113. Console 113 provides a user interface to cluster administrators and it programmed to provide configuration services to cluster 101 according to embodiments of the present invention. Console 113 communicates with individual systems 103 of cluster 101 via LAN 105. Console 113 is coupled to a configuration database 115. Configuration database 115 is adapted to store configuration data according to embodiments of the present invention as well as other configuration information.

Figure 2:
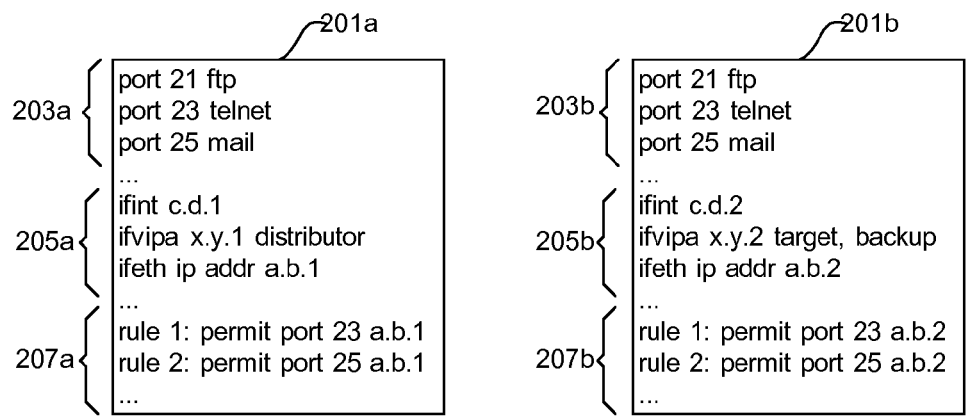
FIG. 2 is a pictorial representation of network configurations of individual systems of a clustered system.

FIG. 2 illustrates configuration resource files 201 for two individual systems 103 of cluster 101. Each system 103 includes a plurality of resources. Resources 203 are well-known, standardized, Transport Control Protocol (TCP) ports that are the same for all individual systems 103 of cluster 101 and are not system-specific. A set of resources 205 comprise Internet Protocol (IP) addresses. As can be seen from FIG. 2, resources 205 are different for each system 103 and are thus system-specific. However, it will be noted that resources 205 share certain common features across individual systems 103. More particularly, resources 205 share common interface types (iftype) and sub-net masks. Interface types of resources 205 include ifint (iftype=internal), ifnvipa (iftype=virtual_Internet_Protocol_address), and ifeth (iftype=Ethernet). Each interface type is associated with a unique address sub-net mask. Interface type ifint is uniquely associated with sub-net mask c.d.; interface type ifvipa is uniquely associated with sub-net mask x.y.; and interface type ifeth is uniquely associated with sub-net mask a.b. Finally, a set of resources 207 comprise system specific filter policy rules.

As will be described in detail hereinafter, console 113 is programmed according to embodiments of the present invention to discover and capture the network configuration resources for each individual system 103 in cluster 101. System resource configuration may be captured from command output from the active individual system or by using well-defined system application programming interface (APIs). The captured resources may be stored in configuration database 115 in a table such as table 300 of FIG. 3. Table 300 includes a column for each system in cluster 101, which lists the configuration resources for its respective system.

According to embodiments of the present invention, the resources of each individual system of the cluster are mapped to reusable objects, as illustrated in table 400 of FIG. 4. Each reusable object is identified by a name shown in column 401 of table 400. In FIG. 4, reusable object names are set out in all capitals. For non-system-specific resources, such well-know TCP ports, the name may be simply the common name of the port. For system-specific resources, such as IP addresses, the name may be the interface type associated with the IP address resource. It should be recognized, however, that the names may be arbitrary.

Once the resources have been mapped to the reusable object names, configuration of the cluster may be managed using the object names rather than the specific resources themselves. Higher level reusable objects, such filter rules that can be applied across the cluster, can be created one using the object names rather than creating and applying a rule for each individual system. Reusable objects allow subsequent changes, such new IP addresses or port assignments to be made once and applied across the cluster. New individual systems may be added to the cluster simply by updating the mapping table with the resources of the new system.

Figure 5:
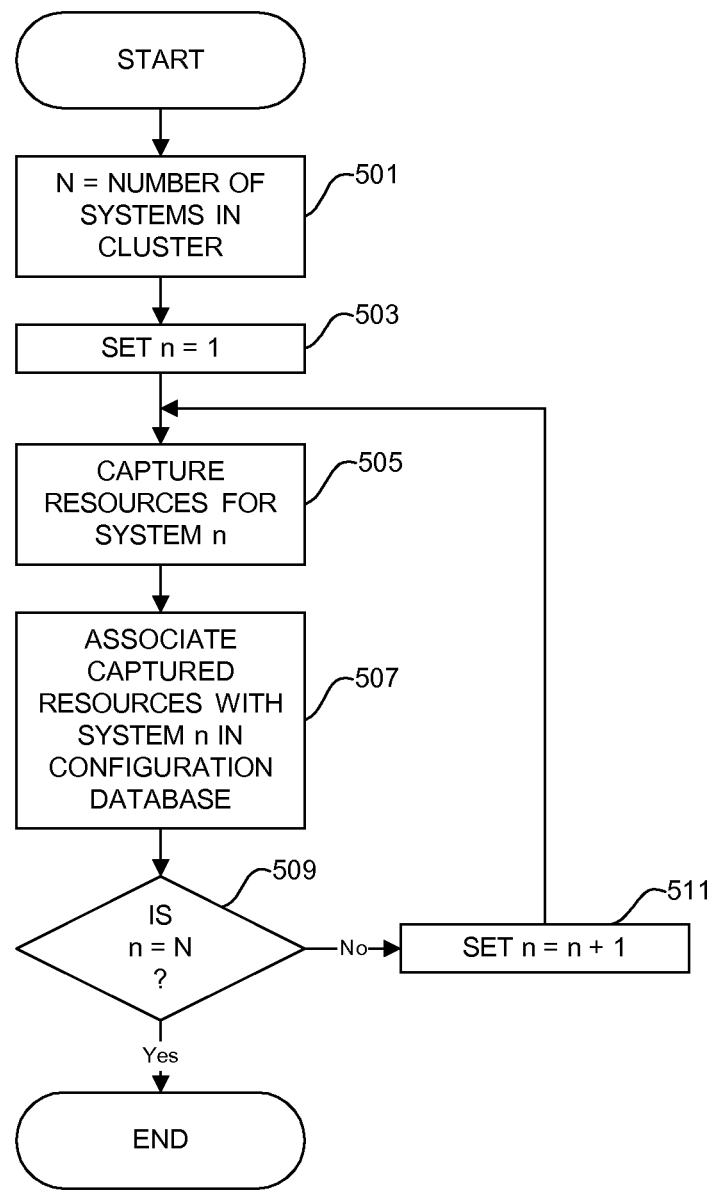
FIG. 5 is a flowchart of an embodiment resource capture according to the present invention.

FIG. 5 is a flow chart of an embodiment of resource capture. The system is initialized at block 501 by setting a constant N equal to the number of systems in the cluster and setting n equal to 1, at block 503. The system captures the resources for system n, at block 505, and associating the captured resources with system n in the configuration database, at block 507. Then, the system determines, at decision block 509, if n is equal N. If n is not equal to N, the system sets n equal to n plus one, at block 511, and returns to block 505. Processing according to FIG. 5 continues until all resources have been captured.

Figure 6:
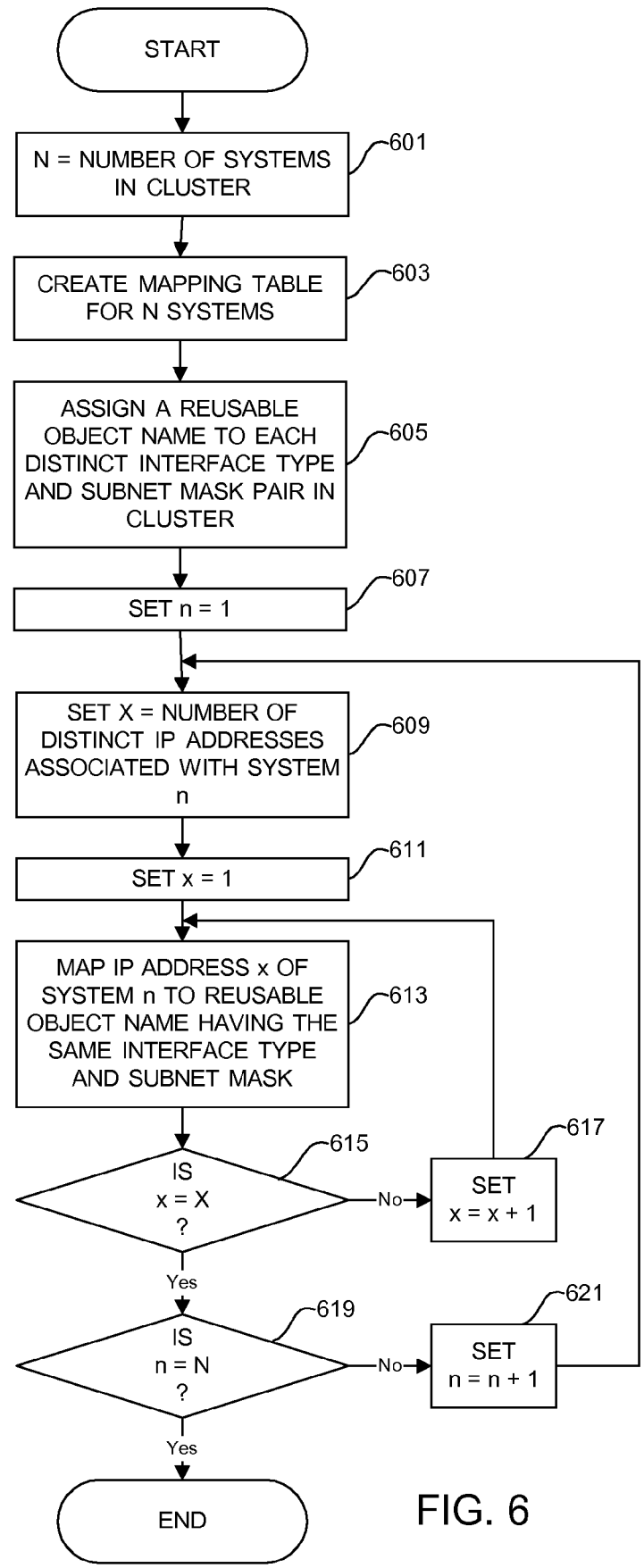
FIG. 6 is a flowchart of an embodiment of mapping system-specific resources to reusable object names according to the present invention; and, FIG. 7 is a block diagram of a computing device in which features of the present invention may be implemented.

FIG. 6 is a flow chart of an example of mapping system specific IP addresses to reusable object names according an embodiment of the present invention. The system sets a constant N equal to the number of systems in the cluster, at block 601. Then the system creates a mapping table for the N system, at block 603. The system assigns a reusable object name to each distinct pair of interface name and subnet address in the cluster, at block 605, and sets n equal to one, at block 607. The system then sets a constant X equal to the number of distinct IP address associated with system n, at block 609, and set x equal to 1, at block 611. The system maps IP address x of system n to the reusable object name having the same interface name and subnet mask as IP address x, at block 613. If, as determined at decision block 615, x is not equal X, the system sets x equal to x plus 1, at block 617, and returns to block 613. If x is equal to X, the system determines, at decision block 619, if n is equal to N; if not, the system sets n equal to n plus 1, at block 612, and returns to block 609. Processing according to FIG. 6 continues until all IP address of the cluster have been mapped to reusable object names.

Figure 7:
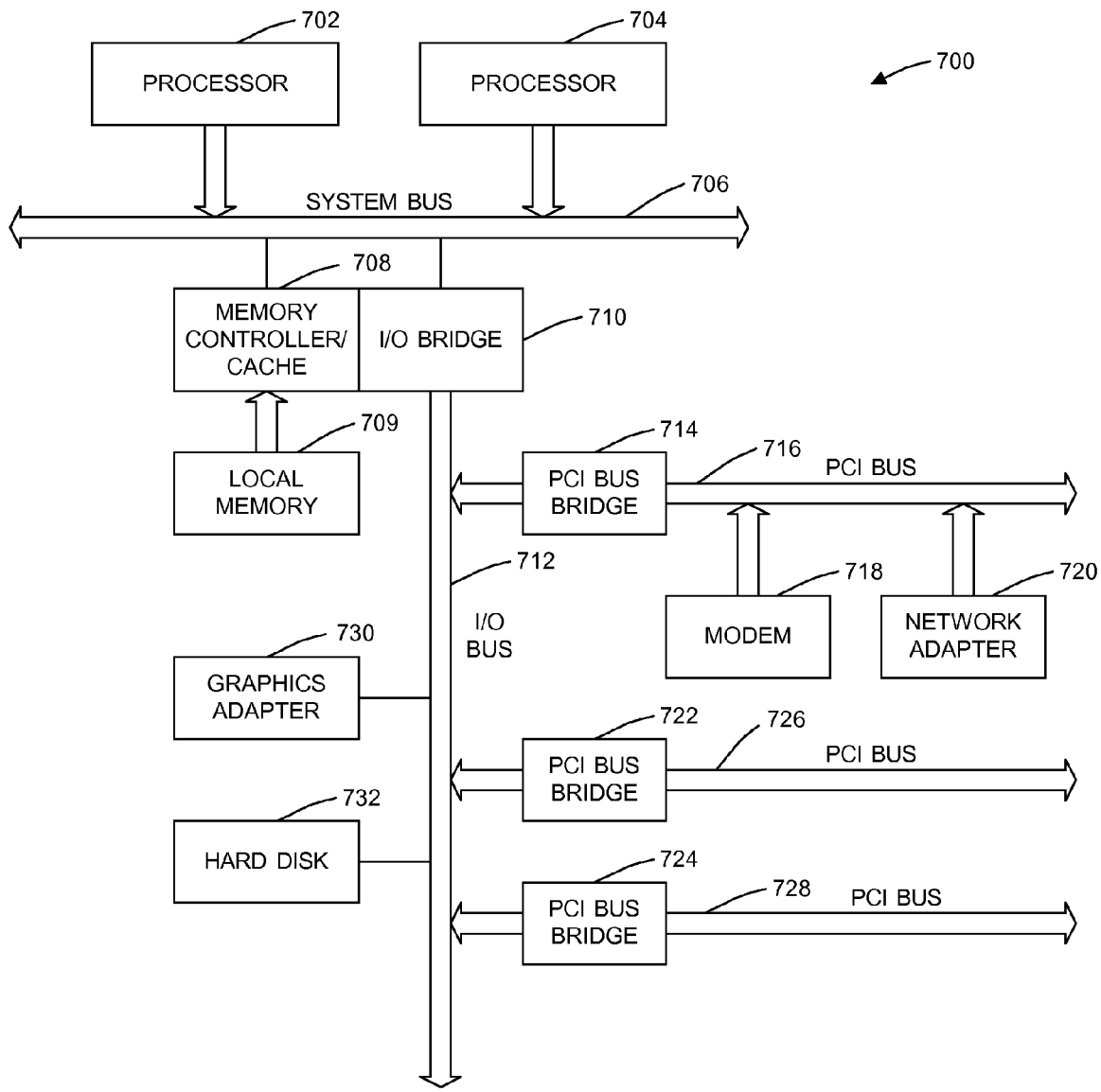

FIG. 7 is a block diagram of a data processing system upon which embodiments of the present invention may be implemented. Data processing system 700 may be a symmetric multiprocessor (SMP) system including a plurality of processors 702 and 704 connected to system bus 706. Alternatively, a single processor system may be employed. Also connected to system bus 706 is memory controller/cache 708, which provides an interface to local memory 709. I/O bus bridge 710 is connected to system bus 706 and provides an interface to I/O bus 712. Memory controller/cache 708 and I/O bus bridge 710 may be integrated as depicted.

Peripheral component interconnect (PCI) bus bridge 714 connected to I/O bus 712 provides an interface to PCI local bus 716. A number of modems may be connected to PCI local bus 716. Typical PCI bus implementations will support four PCI expansion slots or add-in connectors. Communications links to networks may be provided through a modem 718 or a network adapter 720 connected to PCI local bus 716 through add-in boards. Additional PCI bus bridges 722 and 724 provide interfaces for additional PCI local buses 726 and 728, respectively, from which additional modems or network adapters may be supported. In this manner, data processing system 700 allows connections to multiple network computers. A memory-mapped graphics adapter 730 and hard disk 732 may also be connected to I/O bus 712 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 7 may be, for example, an IBM® eServer™ pSeries system, a product of International Business Machines Corporation in Armonk, N.Y., running the Advanced Interactive Executive (AIX™) operating system or LINUX operating system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A system for generating reusable network configuration objects comprising:
    a system bus;
    a local memory connected to the system bus, wherein the local memory has computer program code stored thereon;
    one or more processors connected to the system bus wherein at least one of the one or more processors executes the computer program code stored in the local memory to direct an administrative system for managing configuration of a networked system of individual computers, to:
    automatically capture network resources for each individual computer of the networked system using a configuration resource file associated with a respective individual system into a configuration data structure associated with the networked system;
    define a reusable object name for each distinct class of network resources in the configuration data structure, wherein each distinct class of network resources has at least one common feature across each individual system of the networked system; and,
    automatically map each network resource having a particular class of each individual system to a corresponding reusable object name defined for said particular class.

2. The system as claimed in claim 1, wherein said networked system comprises a cluster of two or more individual systems.

3. The system as claimed in claim 1, wherein at least one of said distinct class of network resources is defined by a paired interface type and address sub-net mask.

4. The system as claimed in claim 1, wherein said administrative system is further directed to:
   combine said reusable object names to form higher-level reusable objects.

5. The system as claimed in claim 4, wherein said higher-level reusable objects comprise network configuration rules.

6. The system as claimed in claim 4, wherein said higher-level reusable objects comprise filter rules.

7. The system as claimed in claim 1, wherein said administration system is further directed to:
   generate a data structure associating each network resource of each system in the networked system with a corresponding reusable object name.

8. A computer program product for generating reusable network configuration objects comprising:
   a computer readable storage device having computer program instructions stored thereon for execution by a computer, the computer program instructions comprising:
   computer program instructions for automatically capturing network resources of each individual computer of a networked system;
   computer program instructions for defining a reusable object name for each distinct class of network resources in the configuration data structure, wherein each distinct class of network resources has at least one common feature across each individual system of the networked system; and,
   computer program instructions for automatically mapping each network resource of each individual system to the reusable object name defined for said particular class of network resources, each said class defined by including the at least one common resource feature.

9. The computer program product as claimed in claim 8, wherein said networked system comprises a cluster.

10. The computer program product as claimed in claim 8, wherein each said class of network resources is defined by a paired interface type and address sub-net mask.

11. The computer program product as claimed in claim 8, further comprising:
    computer program instructions for automatically combining said reusable object names to form higher-level reusable objects.

12. The computer program product as claimed in claim 11, wherein said higher-level reusable objects comprise network configuration rules.

13. The computer program product as claimed in claim 11, wherein said higher-level reusable objects comprise filter rules.

14. The computer program product as claimed in claim 8, wherein the computer program instructions for automatically mapping further comprise:
    computer program instructions for automatically generating a data structure associating each network resource of each system in the networked system with a corresponding reusable object name.

* * * * *